UNITED STATES PATENT OFFICE 2,116,705

PIPE JOINT

Franz Marx and Otto Möglich, Wetzlar-on-the-Lahn, Germany

Application January 18, 1936, Serial No. 59,740
In Germany January 23, 1935

2 Claims. (Cl. 285—163)

This invention relates to pipe joints of the spigot and socket type having a sleeve-shaped gasket.

An object of the invention is to provide an elastic, insulating pipe joint which will be reliable in operation, as well as easy and simple to apply and dismantle.

According to the present invention, the gasket sleeve has an annular portion which is elastic and of enlarged cross-section, in such a manner that this portion can effect the entire sealing against the operative pressure at the joint merely owing to the elastic deformation of this sealing portion upon inserting the spigot of the one pipe with the sleeve mounted upon its end into the socket of the other pipe. This sealing portion of the gasket sleeve has adjacent thereto at the end facing the bottom of the socket a portion having a heel engaging behind the end of the spigot, which heel consists of relatively unyielding leather-like material.

According to the invention therefore the gasket sleeve consists of a highly elastic portion effecting the sealing and of a relatively unyielding leathery portion which holds the gasket sleeve against shifting. Both portions are combined with each other to form a unitary entity.

The resulting gasket sleeve is preferably made of two different kinds of rubber. The portion with the heel engaging behind the end of the spigot consists of a harder leathery type of rubber united with a portion of soft rubber of larger cross-section which effects the sealing. The sealing bead of soft rubber is preferably arranged about in the middle of the gasket sleeve.

It is essential that the sealing should be effected by only a narrow annular area in the socket. If the entire gasket sleeve were given a cross-section corresponding to the diameter of the bead with the aim of sealing over the whole area, such a sleeve could not be introduced into the space between the spigot and the wall of the socket.

Inserts of metal or other material may be embedded in the relatively unyielding leathery portion of the gasket sleeve, said inserts being surrouned on all sides by the preferably electrically insulating gasket material, so that no galvanic couples capable of favoring corrosion can be formed.

The drawing illustrates by way of example three constructions of pipe joint embodying the present invention.

In the drawing all of the figures of which are partial cross-sections of the pipe joint, Figs. 1 and 2 illustrate the first construction.

Fig. 1 showing the pipe joint before the socket is fully pushed over the spigot carrying the gasket sleeve, and Fig. 2 showing the completed joint.

Figure 1:
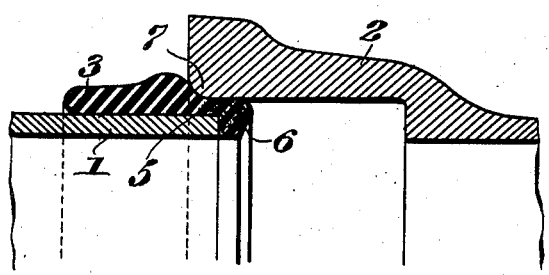
Figure 2:
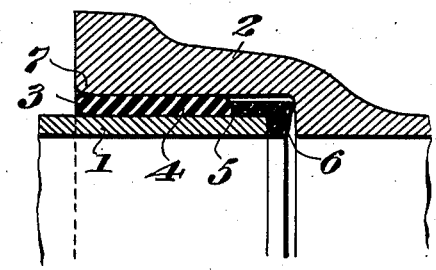

In the example shown in Figs. 1 and 2, the spigot end 1 of one of the pipes, cooperating with the socket 2 of the other pipe, is shown carrying the gasket sleeve which has an outer portion 3 merging into a bead 4 of soft rubber, which bead portion adjoins the inner portion 5 having a heel 6 which engages around the end of the spigot. This inner portion 5 and 6 of the gasket sleeve is made of relatively unyielding leathery rubber. The outer wall of the spigot and the inner wall of the socket are smooth, but the mouth of the socket is rounded as shown at 7 to facilitate the insertion of the spigot and gasket sleeve.

The bead 4 may be on the outer side of the gasket sleeve and the inner side of the latter may be smooth, or the bead may be on the inner side of the gasket sleeve and the outer side of the latter smooth. The bead may also be distributed on both sides of the sleeve.

In Fig. 2, it can be seen how the leathery hard portion of the gasket sleeve serves the purpose of holding the sealing portion in the correct position and at the same time insulating the two pipes from each other.

Figure 3:
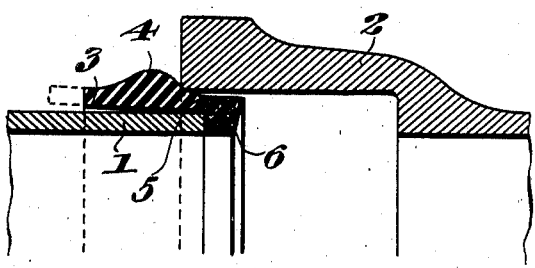
Figs. 3 and 4 illustrate a joint employing a somewhat different form of gasket sleeve.
Figure 4:
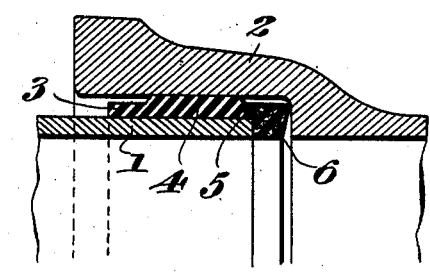

In the modification illustrated in Figs. 3 and 4, the sealing bead 4 merges into the outer portion of the gasket sleeve more gradually than the bead merges into the inner portion. The distance between the outer edge of the sealing sleeve and the middle of the sealing bead is thus reduced to about one-fourth of the depth of the socket.

With this arrangement, the outer end of the socket is left unfilled, which permits considerable mobility of the joint in all directions. Departures as much as 11° from a straight line are obtainable without difficulty and without impairing the sealing of the joint. Furthermore, owing to this shortening of the front portion of the gasket sleeve, there is a considerable economy of rubber. This modification is preferable for all purposes in which the highest degree of effective insulation between the pipes is not of primary importance. The gradual transit from the bead 4 to the front end of the gasket sleeve in this modification is intended to provide against the danger of the sleeve folding over during insertion into the socket.

In order to show clearly the distinction between the form of gasket sleeve shown in Fig. 1 and that shown in Fig. 3, dotted lines in the latter figure indicate the contour of a gasket sleeve according to Fig. 1.

In the modification shown in Figs. 3 and 4, the contour of the sealing bead 4 falls more slowly towards the front end 3 of the sleeve than towards the rear end 5 which carries the anchoring heel 6. This heel engages around the spigot end 1 of the pipe to be inserted into the socket 2. Fig. 4 shows clearly how the mouth of the socket is unfilled.

Figure 5:
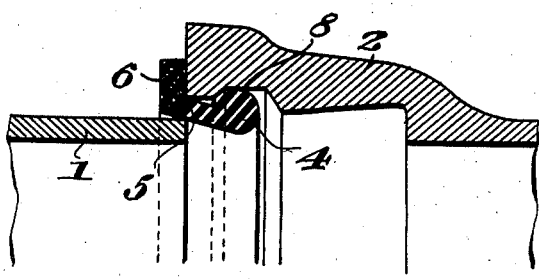
Figs. 5 and 6 show a further modification of the joint.
Figure 6:
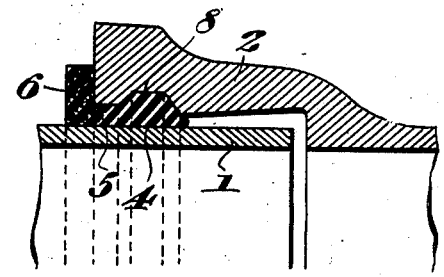

In the two modifications which have been described, the heel portion of the gasket sleeve engages around the spigot end of the pipe which is to be inserted in the socket, whereas in the modification illustrated in Figs. 5 and 6 the sealing 4 is provided at the inner end of the gasket sleeve which faces the bottom of the socket, and the anchoring heel 6 of the sleeve engages the front face of the socket. In applying this type of gasket sleeve, the latter is first placed in position in the socket and then the spigot is pushed in. On the other hand, as in the first described modifications, the heel portion 6 is made of leathery hard material, such as hard rubber, and the sealing bead 4 is made of highly elastic material, for example, soft rubber and the two connected together by the portion 5.

In this latter form of joint, in order to prevent the gasket sleeve from being forced out of the socket by the action of the pressure in the pipe, the mouth of the socket may be provided with an inwardly projecting flange corresponding in width to the width of the annular middle portion of the sleeve, behind which flange the sealing bead 4 will lie. In addition to, or instead of, this flange, the socket may be provided inwardly from its mouth with a recess or groove 8 adapted to receive the bead of the gasket sleeve, which bead is preferably formed on the outer side of the sleeve.

Figs. 5 and 6 show the socket with an inner flange at its mouth, and the gasket sleeve with soft rubber bead 4 and a portion 6 consisting of hard leathery material which is hook-shaped and engages the front face of the socket. The inner wall of the gasket sleeve is smooth and the bead 4 is formed on the outer wall, which enables the spigot end 1 to be pushed in without difficulty. This action results in the sealing bead 4 being deformed to the shape illustrated in Fig. 6.

We claim as our invention:

1. A gasket particularly for a pipe joint of the spigot and socket type, comprising a sleeve having an annular portion of enlarged cross-section extending over only a fraction of the length of the sleeve and of elastic constituency and capable itself alone of effecting the sealing action against operative pressure at the joint, said sleeve also having a heel consisting of a relatively unyielding leather-like material, and said sleeve by the mere forcing of the spigot into the socket adapted to assume a position such that the heel engages against one end of one of the pipes of the joint and the annular portion is elastically deformed to press against the spigot and the socket.

2. A gasket according to claim 1, in which the heel engages the outer end or front face of the socket and in which the socket is provided with an annular groove into which the annular enlarged portion projects.

FRANZ MARX.
OTTO MÖGLICH.